United States Patent

[11] 3,618,877

[72] Inventor Franklin W. Peters
Liberty Hall R. D. #5, Box 341,
Charlottesville, Va. 22902
[21] Appl. No. 881,409
[22] Filed Dec. 2, 1969
[45] Patented Nov. 9, 1971

[54] FLEXIBLE TAIL AIRCRAFT
9 Claims, 4 Drawing Figs.
[52] U.S. Cl.................................................. 244/75 R,
244/87, 244/90 R
[51] Int. Cl.................................................... B64c 17/00,
B64c 9/08
[50] Field of Search............................................ 244/75, 83,
87, 96–99, 153–155, 128, 1, 90, 117, 119, 34, 35,
40, 41, 3, 3.24, 3.27, 3.3, 13; 114/209, 234, 235

[56] References Cited
UNITED STATES PATENTS
3,135,483 6/1964 Girard........................... 244/75
3,446,458 5/1969 Rogallo......................... 244/43

Primary Examiner—Milton Buchler
Assistant Examiner—F. K. Yee
Attorney—Beveridge & DeGrandi ABSTRACT: Aircraft having a pair of elongated, flexible tails for maneuvering as well as stabilizing the aircraft in flight. The tails extend a distance at least three times the length of the fuselage and are hollow to receive compressed air for maintaining the tails in elongated, inflated, rearwardly projecting condition. The compressed air conveyed through the tails may be provided by a turbine associated with a jet engine which propels the aircraft. Maneuverability and stability of the aircraft is achieved upon selective movement of the tails which may be accomplished by controlling the flow of air through the tails as well as venting the air from various locations on the tails. Mechanical means may also be provided to supplement actuation of the tails to provide the desired stabilization and maneuverability.

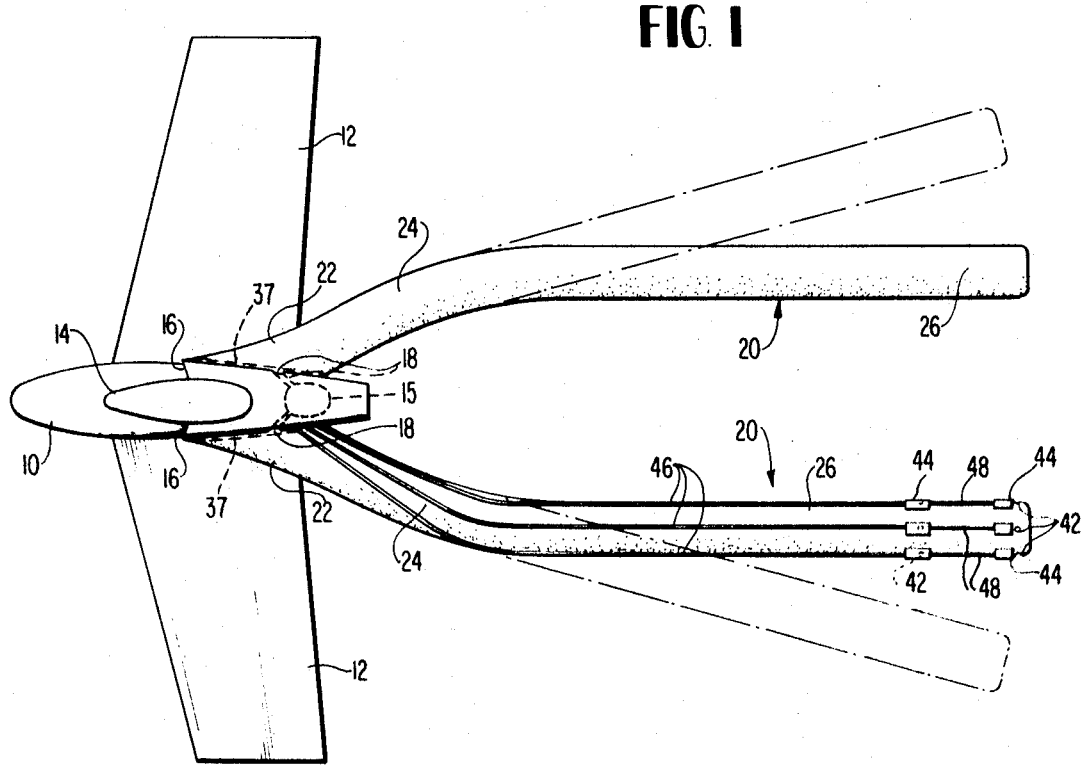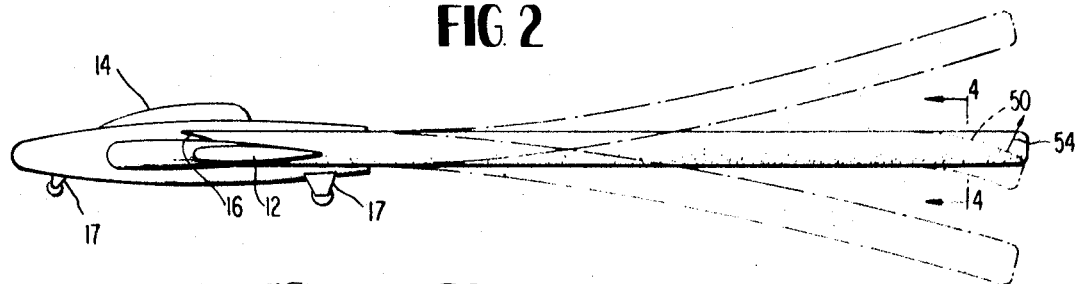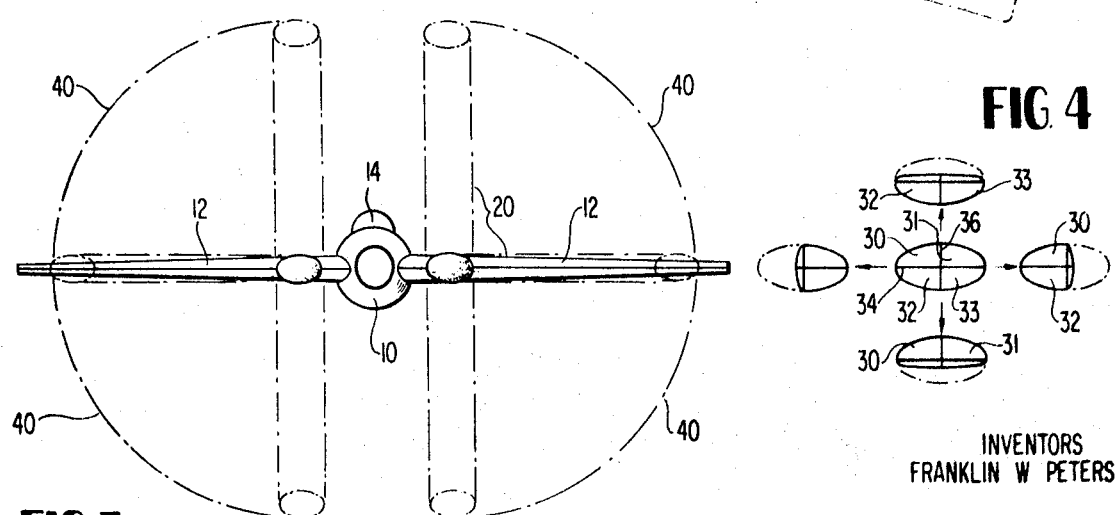

FLEXIBLE TAIL AIRCRAFT

SUMMARY OF OBJECTS AND INVENTION

The present invention relates to aircraft and has for one of its objects the provision of a novel aircraft which for its size and propulsion, has exceedingly high characteristics of maneuverability and stability.

A further object of the present invention is to provide such an aircraft which will achieve high pitching movements and sharp turns while also possessing a low stalling speed when compared to conventional aircraft of similar size and propulsion power.

The above and other objects are achieved in a conventionally winged aircraft by forming its tails section with a pair of elongated hollow flexible tubes (also termed tails herein) the inner ends of which are attached to the fuselage of the aircraft to be supplied with a compressed gas such as air which may be produced by a turbine associated with a jet engine that propels the aircraft. The outer ends of the tails are free to permit them to be moved vertically and horizontally to control pitching, rolling, and yawing movements of the aircraft in flight. During use, the tubes are maintained in elongated, inflated condition by the compressed air passing through the tubes and exiting from the outer free ends of the tubes which are open.

Actuation of the tubes may be achieved by selectively controlling the flow of the compressed air therethrough. In one embodiment, each tube is divided into four compartments which may be selectively placed into registry with the compressed air to partly or fully inflate the tube and thereby impart a desired movement to the tube for controlling the aircraft. Movement of the tails may further be achieved by providing a plurality of vent passages at circumferentially and axially spaced locations along the tail to vent portions of the compressed air and thereby provide a reaction force opposite to the direction of venting to cause a desired movement of the tail. In addition, mechanical means may be provided to augment actuation of the tails. Small vertical stabilizers may also be employed on the tails, if desired, to eliminate or reduce tendency of the aircraft to yaw.

The tails may be formed from any suitable flexible weather-resistant and durable material such as neoprene. It is preferred that the body of the aircraft including the wings have a lightweight construction.

The invention will become further understood upon reference to the following more detailed description taken in conjunction with the attached drawings in which:

FIG. 1 is a plan view of an aircraft embodying the present invention and also showing one position of the tail section in phantom lines.

FIG. 2 is a side elevational view of the aircraft with phantom lines indicating other positions of the tail section;

FIG. 3 is a rear end view of the aircraft also illustrating the range of positions, which may be achieved by the tail section;

FIG. 4 is a cross sectional view of a tube included in the tail section taken generally along lines 4—4 of FIG. 2 and also illustrating various positions of the tube.

DETAILED DESCRIPTION

Referring now to the drawings in detail, FIG. 1 illustrates an aircraft embodying the invention comprising a fuselage 10 having laterally projecting wings 12, and a canopy 14 all of which may have any suitable or conventional construction, preferably lightweight. Any suitable propulsion engine such as a jet engine 15 may be provided; however it is preferred that it include a turbine positioned in the rear of the fuselage with air intakes 16 on opposite sides of the fuselage and exhaust passages illustrated at 18 on opposite sides of the fuselage rearwardly of intake passages 16.

In accordance with the present invention, a unique tail section is provided for maneuvering the aircraft as well as for providing stability thereto. This tail section is comprised of two elongated, tubular members or tails 20 which have a length at least approximately three times the length of the fuselage.

Tails 20 are formed from a flexible, durable, and weather-resistant material such as neoprene and width dimension to provide sufficient external pressure reactant surface for controlling the aircraft as will become apparent. The inner ends 22 of the tails are open and suitably secured to opposite sides of the fuselage to be placed in registry with the exhaust passage of the turbine so that compressed air may be directed through tails 20. The outer or free ends of the tubular members are open to permit the exhaust gases to be discharged therefrom.

In the specific embodiment shown, tails 20 are constructed so that when fully inflated, they will have an elliptical cross section and extend rearwardly and symmetrically on opposite sides of the longitudinal axis of the craft as shown by the full lines in FIG. 1 wherein tail sections 24 extend away from the fuselage at an acute angle, and tail sections 26 extend in generally parallel interrelationship. This is accomplished by appropriate design of the inner and outer lengths of the tubular members 20.

In order to maneuver the aircraft as well as to control pitching, rolling, and yawing movements, the tails may be independently actuated upwardly or downwardly, laterally inwardly or outwardly, as well as diagonally between the vertical and horizontal. This is effected by selectively controlling the flow of air through tubes 20 as well as the discharge therefrom. In the illustrated embodiment, flow control is achieved by dividing each of the tails into four angularly spaced compartments 30, 31, 32, and 33 such as by elongated flexible partition strips 34 and 36 extending throughout the tails and attached to the side walls thereof with one partition strip intersecting the other partition strip along the longitudinal center lines thereof. Any suitable valve mechanism schematically illustrated at 37, is provided between the air outlet of the turbine and the inlet end of the tails to selectively control the admission of compressed air into the various compartments in each tail as desired. In this manner, one or any number of the compartments may be provided with compressed air to provide a desired movement in the associated tail. For example, and referring to FIG. 4, if it is desired to move the tail upwardly, the two upper compartments 30, 31 are closed with respect to the turbine air-discharge passage while the two lower compartments 32, 33 are opened to the turbine air-discharge passage so that compressed air will flow only through the two compartments 32, 33. This will have an effect of moving the tail upwardly as indicated by the arrow in FIG. 4. If it is desired to move the tail downwardly, compartments 32, 33 are closed from the turbine air discharge while compartments 30, 31 are open. If it is desired to move the tail laterally outwardly to the right as viewed in FIG. 4, compartments 30, 32 are inflated while the outer compartments 31, 33 are closed for deflation as illustrated in FIG. 4. Lateral movement of the tails to the left as viewed in FIG. 4, would be accomplished by deflating compartments 30, 32 and inflating 31, 33. An outer position of the tails is also illustrated by the phantom lines in FIG. 1. In all cases the degree of movement will depend upon the amount of inflation or deflation of the various compartments.

Tails 20 may also be moved partly vertically and partly horizontally into portions indicated by phantom lines 40 in FIG. 3. For example if it is desired to move the tail into an angular position of 45°, this may be done by inflating compartments 30, 32, 33 and deflating compartment 31.

Actuation of tails 20 may be supplemented by providing vent passages 42 at locations spaced axially as well as circumferentially along the tails to vent the compressed air from the compartments through passages 42 to provide a desired movement resulting from the reaction of the venting air. Closing and opening of vent passages 42 may be effected by movable valve closures 44 operable through cables 46 and 48. Although in the shown embodiment only two sets of vent passages 42 are provided at the free ends and at an intermediate section of the tail, additional sets may be provided at longitudinally spaced locations. Although in FIG. 1, the venting system 42, 44 is shown only on one of the tails 20, it will be understood that the other tail will have a similar venting system including cables 46, 48. By venting air from one or two vent passages 42 in one direction, a reaction force can be produced on the tail tending to move the tail in a direction opposite to the direction of venting. This not only can be employed to augment the tail movement described above, but it also can be employed to provide pitch control movement of the free end of the tail as illustrated by phantom lines 50 in FIG. 2 wherein the direction of air venting is illustrated by arrow 54.

In order to produce roll movement of the craft during flight, tails 20 are actuated in the vertical direction but in opposite directions as illustrated by the phantom lines in FIG. 2. For high pitching movements the tails are curved in the same direction in vertical planes. Yawing movements can be controlled by moving the tails in the horizontal direction.

Although not shown, a mechanical actuating system may also be provided to supplement actuation of the tails. For example, such a mechanical system may be comprised of a plurality of cables attached to various points along the tails, and a suitable motor for actuating the cables and in turn the tails.

Any suitable landing gear such as 17 may be applied to the underside of the aircraft. During landing and takeoff of the aircraft, tails 20 will be raised from the ground by maintaining the tails in fully inflated condition. For ground movement however, any suitable dolleys (not shown) may be placed under the tails. If it is desired, small vertical stabilizers may be attached to the tails to eliminate any significant yawing movements of the craft. Similarly, conventional flaps or ailerons may be provided on the wings to insure proper stability control and maneuverability.

I claim:

1. Aircraft comprising in combination, a fuselage, wings projecting laterally from the fuselage, propulsion means, a tail section providing pressure reactant surfaces for steering and stabilizing the aircraft in flight including a pair of flexible elongated tails fixed at one end to the fuselage and extending rearwardly from the fuselage a distance several times greater than the length of the fuselage and terminating in free ends, and means for moving the tails laterally or vertically for steering and stabilizing the aircraft in flight.

2. Aircraft defined in claim 1 wherein said tails have a hollow tubular construction and there is further provided means for inflating the tails during flight of the aircraft.

3. Aircraft defined in claim 2 wherein said means for inflating said tails includes means for supplying compressed air into said tails.

4. Aircraft defined in claim 3 wherein said propulsion means includes a turbine which constitutes said means for inflating said tails, said turbine having an air discharge passage and wherein the ends of the tails fixed to said fuselage are registrable with said discharge passage for supplying compressed air into the tails.

5. Aircraft defined in claim 3 wherein said tails are open at their free ends to discharge air therefrom, and wherein said means for moving the tails includes a plurality of elongated compartments extending throughout each of the tails and adapted to be placed into selective registration with said means for supplying compressed air for inflating and deflating said compartments.

6. Aircraft defined in claim 5 wherein said means for moving the tails further includes a plurality of vent passages in the tails for venting air transversely from the tails.

7. Aircraft defined in claim 6 wherein said vent passages are located adjacent the free ends of the tails.

8. Aircraft defined in claim 6 further including movable valve members for opening and closing said vent passages.

9. Aircraft defined in claim 4 wherein said tails are made from a plasticlike material.

* * * * *